(12) United States Patent
Hsu

(10) Patent No.: US 7,602,599 B1
(45) Date of Patent: Oct. 13, 2009

(54) METAL-METAL CAPACITOR AND METHOD OF MAKING THE SAME

(75) Inventor: Chien-En Hsu, Hsinchu County (TW)

(73) Assignee: United Microelectronics Corp., Hsin-Chu (TW)

( * ) Notice: Subject to any disclaimer, the term of this patent is extended or adjusted under 35 U.S.C. 154(b) by 0 days.

(21) Appl. No.: 12/170,409

(22) Filed: Jul. 9, 2008

(51) Int. Cl.
*H01G 4/005* (2006.01)
(52) U.S. Cl. ................ 361/303; 361/306.1; 361/306.3; 361/328; 361/330; 361/305; 438/250; 438/253; 438/393; 438/396
(58) Field of Classification Search ................ 361/303, 361/306.1, 306.3, 311, 328–330; 438/250, 438/253, 393, 396; 257/295–296
See application file for complete search history.

(56) References Cited

U.S. PATENT DOCUMENTS

| | | | | |
|---|---|---|---|---|
| 6,232,197 B1 * | 5/2001 | Tsai | ............................ | 438/393 |
| 6,468,858 B1 * | 10/2002 | Lou | ............................ | 438/253 |
| 6,836,399 B2 * | 12/2004 | Lee et al. | .................. | 361/306.1 |
| 6,838,717 B1 * | 1/2005 | Yen et al. | ..................... | 257/295 |
| 6,977,198 B2 | 12/2005 | Gau | | |
| 7,038,266 B2 * | 5/2006 | Wang | .......................... | 257/306 |
| 7,329,955 B2 * | 2/2008 | Tsau | .......................... | 257/758 |
| 7,344,941 B2 * | 3/2008 | Kim | ............................ | 438/253 |
| 2003/0197215 A1 | 10/2003 | Coolbaugh et al. | | |

* cited by examiner

*Primary Examiner*—Nguyen T Ha
(74) *Attorney, Agent, or Firm*—Winston Hsu

(57) ABSTRACT

A method of making a metal-metal capacitor is disclosed, in which a first metal layer, a first dielectric layer, a second metal layer, a second dielectric layer, and a third metal layer are formed in the order over a substrate; an upper capacitor is defined by etching using a first mask, wherein the stop of the etching can be controlled; a lower capacitor is defined by etching using a second mask; and an anti-reflective third mask is formed to cover the surface, and the capacitor border and metal interconnect conductive wire are defined, so as to make a metal-metal capacitor with a stable structure in a wide process window.

16 Claims, 7 Drawing Sheets

METAL-METAL CAPACITOR AND METHOD OF MAKING THE SAME

BACKGROUND OF THE INVENTION

1. Field of the Invention

The present invention relates generally to a metal-metal capacitor (MMC), and particularly to a two side MMC (2-side MMC) having high capacitance density and method of making the same.

2. Description of the Prior Art

Various capacitive structures are used as electronic elements in integrated circuits such as radio frequency integrated circuits (RFIC), and monolithic microwave integrated circuits (MMIC). Such capacitive structures include, for example, metal-oxide-semiconductor (MOS) capacitors, p-n junction capacitors and metal-metal capacitor. The metal-metal capacitor has a metal-insulator-metal (MIM) structure exhibiting improved frequency and temperature characteristics. Furthermore, it can be formed in the metal interconnect layers, thereby to be integrated with the CMOS transistor FOL process. A metal-metal capacitor typically includes a capacitor dielectric layer disposed between lower and upper electrodes and usually needs a rather large area in a die. To increase the circuit density and reduce the cost, large capacitance density is highly desirable. One known method for increasing the capacitance density is to reduce the dielectric thickness. However, the effect is limited since reducing the dielectric thickness generates problems such as undesired high leakage current and poor RF loss tangent. Another approach is to use high dielectric constant dielectrics.

In order to increase the capacitance density, a metal-insulator-metal (MIM) capacitor and a method of making the same are disclosed in U.S. Pat. No. 6,977,198 assigned to the same assignee of the present invention and incorporated herein entirely for reference. As shown in FIG. 1, an MIM capacitor 10 comprises a metal layer 12 disposed on a substrate 100, a metal layer 14 disposed above the metal layer 12 and electrically isolated from the metal layer 12 with a capacitor dielectric layer 13, wherein like reference numerals refer to similar or corresponding elements, regions, and portions. A metal layer 16 is disposed above the metal layer 14 and is electrically isolated from the metal layer 14 with a capacitor dielectric layer 15. A cap layer 22 is deposited on the metal layer 16. The cap layer 22 may be made of silicon oxide or silicon nitride. The MIM capacitor 10 is covered with an IMD layer 120. The metal layer 12, the capacitor dielectric layer 13, and the metal layer 14 constitute a first capacitor ($C_1$). The metal layer 14, the capacitor dielectric layer 15, and the metal layer 16 constitute a second capacitor ($C_2$). The metal layer 12 of the MIM capacitor 10 is electrically connected to a conductive terminal 42 through a metal via 31 that penetrates through the IMD layer 120. The metal layer 14 is electrically connected to a conductive terminal 44 through at least one metal via 32. The metal layer 16 is electrically connected to the conductive terminal 42 through at least one metal via 33 that penetrates through the IMD layer 120 and the cap layer 22.

In a method of making the aforesaid MIM capacitor structure, as shown in FIG. 2, a lithographic process and an anisotropic dry etching process are carried out to etch a stack of the capacitor dielectric layer 13, the metal layer 14, the capacitor dielectric layer 15, the metal layer 16, and the cap layer 22, to form the upper capacitor structure 50 and a part of the lower capacitor structure. The etching stops on the metal layer 12 after the capacitor dielectric layer 13 is etched through. Thereafter, as shown in FIG. 3, a photo resist layer is coated on the metal layer 12 and covers the upper capacitor structure 50 and then patterned to form a photo mask 60a. A metal etching process is performed to etch away the portion of the metal layer 12 not covered by the photo mask 60a, to form a lower capacitor structure 70 and metal interconnect conductive wire. A portion of the cap layer 22 and the underlying metal layer 16 of the upper capacitor structure 50 that are not covered with the photo mask 60a are also etched away in this etching process. Using the cap layer 22 and the metal layer 16 as an etching buffer, the etching can be stopped at the capacitor dielectric layer 15 to complete the configuration of the upper capacitor structure 50. The metal layer 14 has an area smaller than that of the metal layer 12. The metal layer 16 has an area smaller than that of the metal layer 14.

However, the stop of the etching at the capacitor dielectric layer 15 becomes a critical process step due to the narrow process window. The ideal condition is to stop the etching at the capacitor dielectric layer 15 and remain an about 100 angstrom-thick capacitor dielectric layer 15. However, the utilization of the cap layer 22 and the metal layer 16 as an etching buffer leads to a narrow process window, due to different etching performances for different reaction chambers, and variant film properties, thicknesses, or etching rates of the cap layer 22 and the metal layer. These variations cause the etching results to be unstable and hard controlled. FIG. 4 illustrates an example of an insufficient etching stopping at the metal layer 16. FIG. 5 illustrates an example of an over etching stopping at the metal layer 14.

Therefore, a novel metal-metal capacitor as well as a method of making the same is still needed, to avoid the aforesaid disadvantages and attain an improved capacitance density.

SUMMARY OF THE INVENTION

One objective of the present invention is to provide a metal-metal capacitor and a method of making the metal-metal capacitor, in which the process window is relatively wide and a metal-metal capacitor with a stable structure can be obtained.

The method of making a metal-metal capacitor according to the present invention comprises steps as follows. First, a substrate is provided. A first metal layer, a first dielectric layer, a second metal layer, a second dielectric layer, and a third metal layer is formed in the order over the substrate. Subsequently, a first mask layer is formed to cover the third metal layer and patterned to expose a portion of the third metal layer. The portion of the third metal layer exposed and the underlying second dielectric layer are etched using the first mask layer as a mask, and the etching is allowed to stop at the second dielectric layer, while the second dielectric layer is not penetrated, thereby forming an upper capacitor structure comprising a second metal layer, a second dielectric layer, and a third metal layer. Thereafter, a second mask layer is formed to cover the third metal layer and the second dielectric layer and patterned to expose a portion of the second dielectric layer. The portion of the second dielectric layer exposed, the underlying second metal layer and the underlying first dielectric layer are etched using the second mask layer as a mask, and the etching is allowed to stop at the first dielectric layer, while the first dielectric layer is not penetrated, thereby forming a lower capacitor structure comprising a second metal layer, a first dielectric layer, and a first metal layer. The second mask layer is removed. Subsequently, a third mask layer is formed to cover the third metal layer, the second dielectric layer, and the first dielectric layer and patterned to expose a portion of the first dielectric layer. The third mask layer is anti-reflective. The portion of the first dielectric layer exposed, the underlying first metal layer and the underlying substrate are etched using the third mask layer as a mask, and the etching is allowed to stop at the substrate, thereby forming the border of the metal-metal capacitor and a metal interconnect conductive wire comprising the first metal layer. The metal-metal capacitor is separated from the metal interconnect conductive wire by a trench. An inter-metal dielectric layer is deposited to cover the third mask layer and to fill the trench and planarized. The inter-metal dielectric layer and the third mask layer are etched to form at least one via hole on the first metal layer, the second metal layer, and the third metal layer.

The metal-metal capacitor according to the present invention comprises a first metal layer; a first capacitor dielectric layer disposed on the first metal layer; a second metal layer stacked on the first capacitor dielectric layer, wherein the first metal layer, the first capacitor dielectric layer, and the second metal layer constitute a lower capacitor structure; a second capacitor dielectric layer disposed on the second metal layer; and a third metal layer stacked on the second capacitor dielectric layer, wherein the second metal layer, the second capacitor dielectric layer, and the third metal layer constitute an upper capacitor. A portion of the first metal layer is covered with a remaining thickness of the first capacitor dielectric layer and a first mask layer in the order. A portion of the second metal layer is covered with a remaining thickness of the second capacitor dielectric layer and a second mask layer in the order. A portion of the third metal layer is covered with a third mask layer. The first mask layer, the second mask layer, and the third mask layer each are anti-reflective.

Compared to the known technique, in the method of the present invention, masks are utilized in etching processes to form the upper capacitor structure, the lower capacitor structure, and a metal interconnect, respectively and in the order, while the step of using the cap layer and the metal layer as an etching buffer is not carried out. Using a mask layer in the etching can well control the stop of the etching at the capacitor dielectric layer, rather than using the cap layer and the metal layer as an etching buffer. Therefore, the process window is relatively wide.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
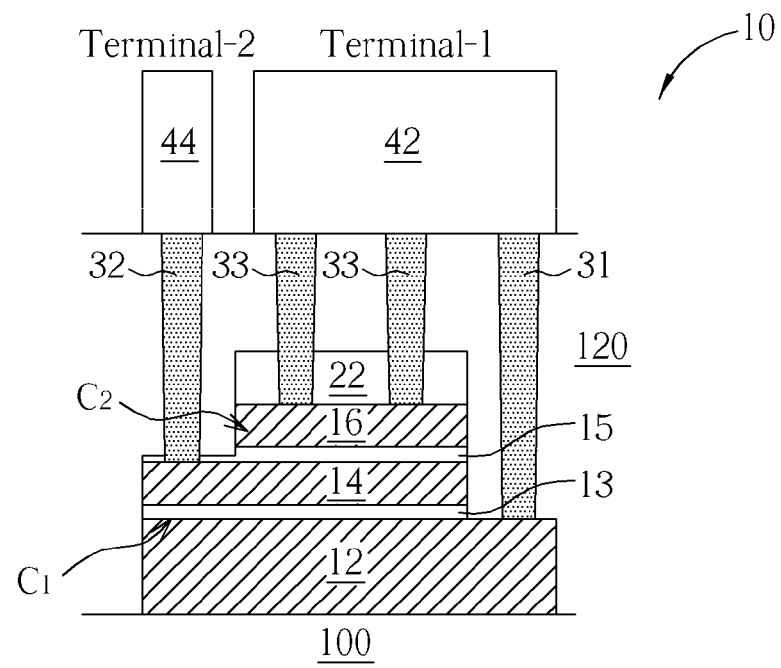
FIG. 1 is a schematic cross-sectional diagram illustrating a capacitor structure of a prior art.
Figure 2:
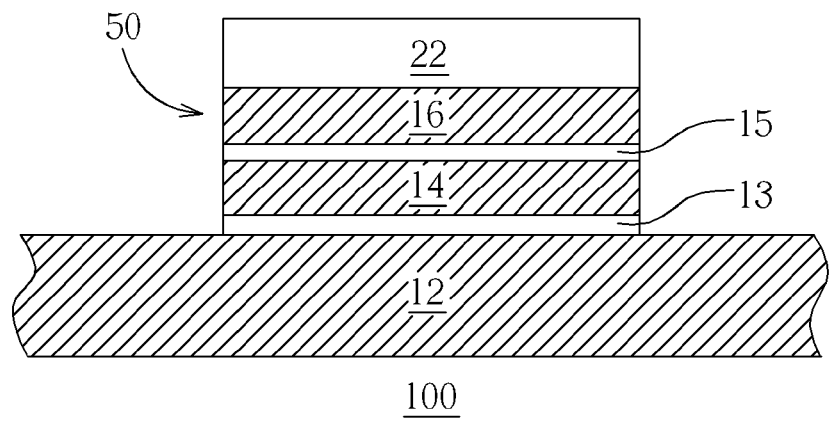
FIGS. 2 and 3 are schematic cross-sectional diagrams illustrating some steps in the method of making the capacitor structure of a prior art.
Figure 3:
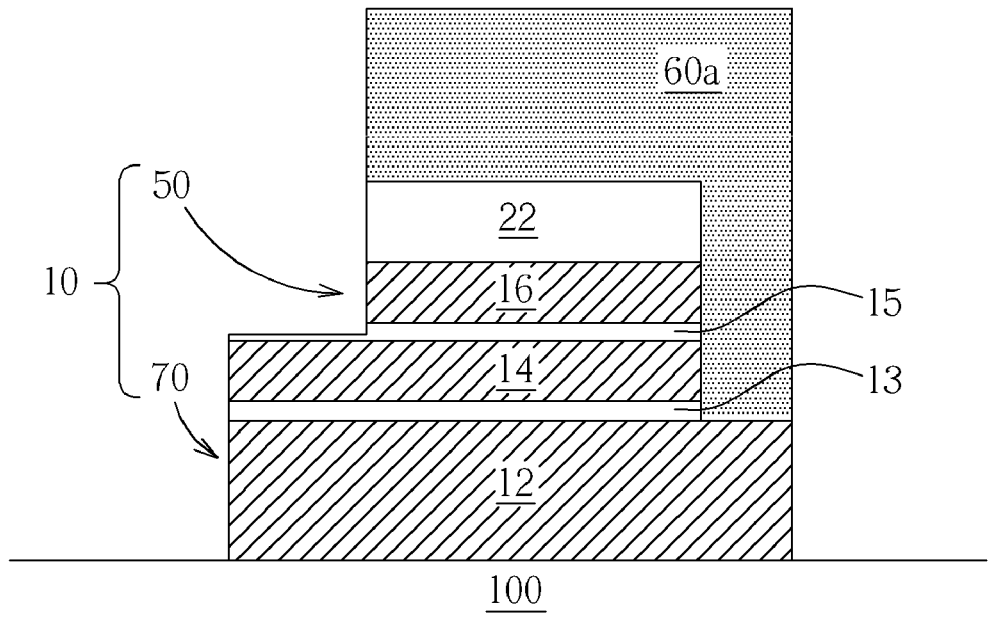
Figure 4:
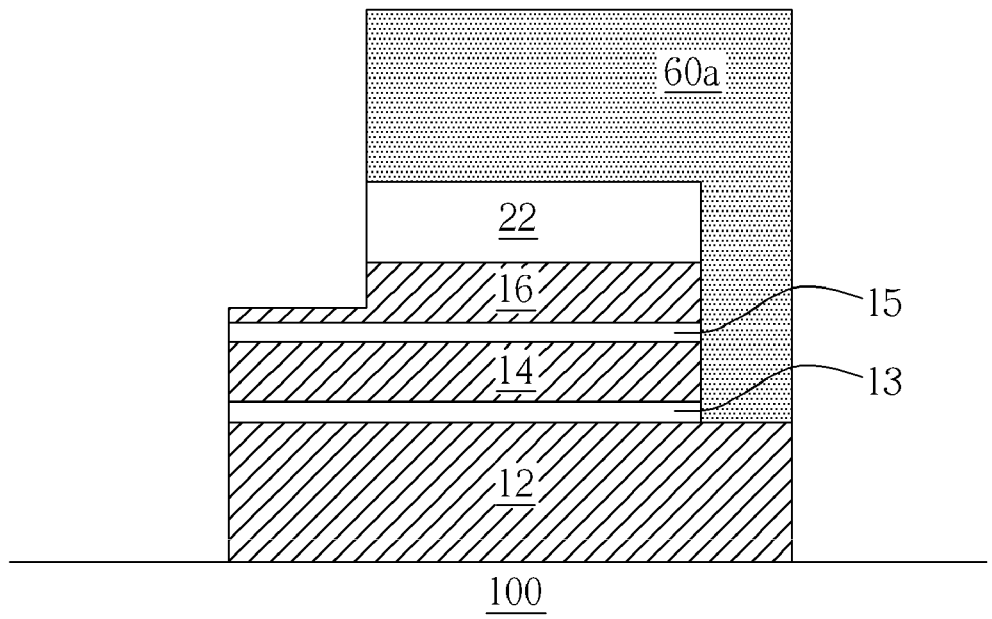
FIGS. 4 and 5 are schematic cross-sectional diagrams illustrating the disadvantages in the method of making the capacitor structure of a prior art.
Figure 5:
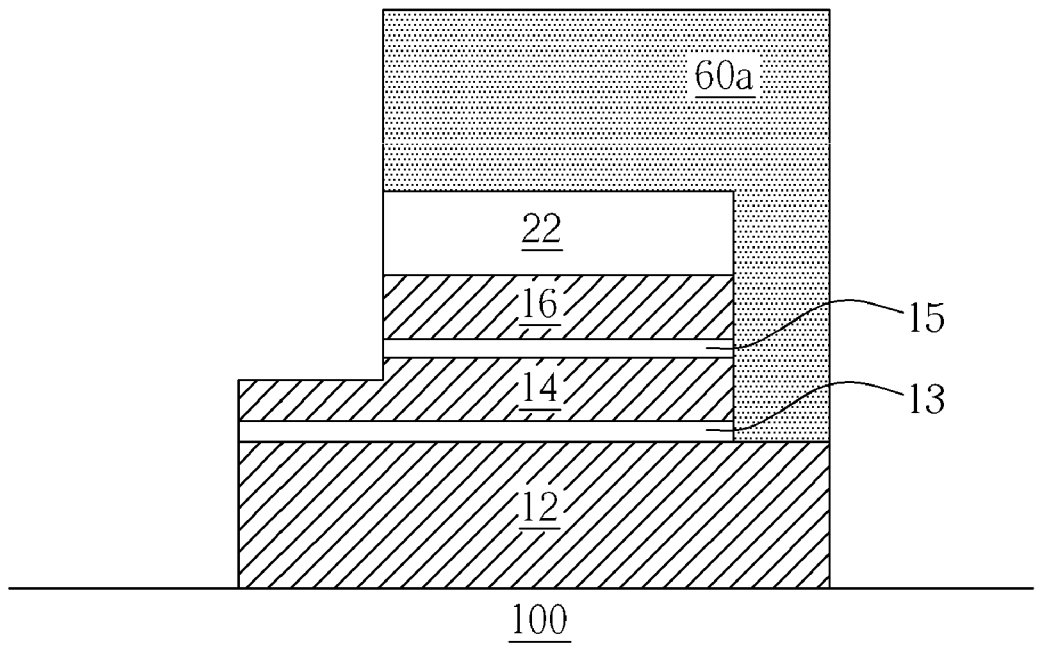
Figure 6:
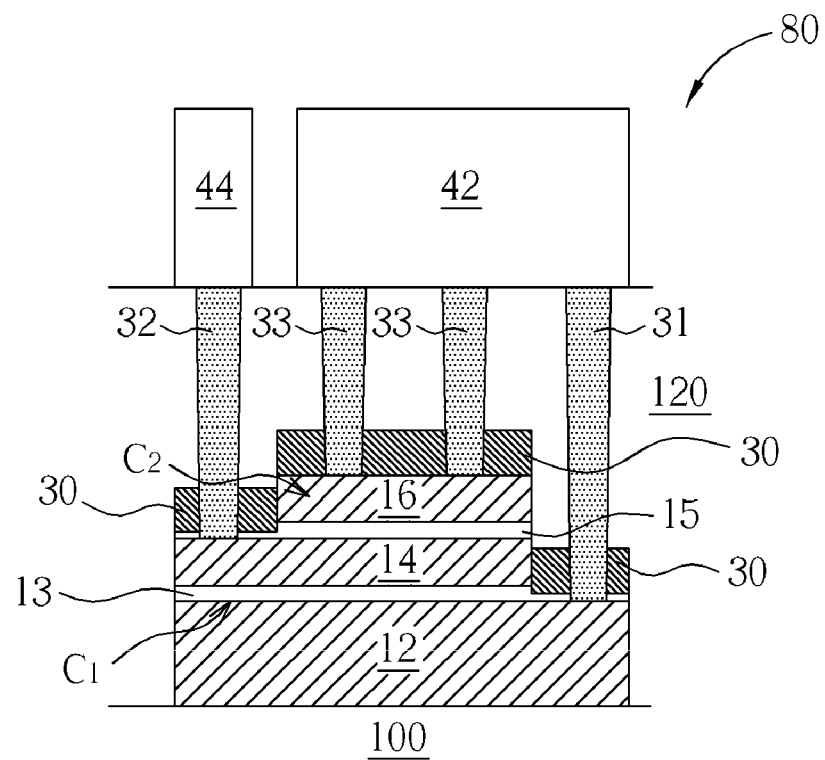
FIG. 6 is a schematic cross-sectional diagram illustrating a metal-metal capacitor structure according to the present invention.

Please refer to FIG. 6. FIG. 6 is a schematic cross-sectional diagram illustrating a metal-metal capacitor structure according to the present invention. The metal-metal capacitor 80 comprises a metal layer 12, which may be defined on a substrate 100 such as an inter-metal dielectric (IMD) layer, but not limited thereto. The metal layer 12 may be one of the layers of metal interconnect of an integrated circuit. For example, the metal layer 12 may be defined simultaneously with the third layer metal (Metal-3) or fourth layer metal (Metal-4) of metal interconnects of the integrated circuit. A metal layer 14 is stacked above the metal layer 12 and is electrically isolated from the metal layer 12 with a capacitor dielectric layer 13. A metal layer 16 is stacked above the metal layer 14 and is electrically isolated from the metal layer 14 with a capacitor dielectric layer 15. The metal layer 12 of the metal-metal capacitor 80 has a portion not covered by the metal layers 14 and 16, while the top surface of this portion is covered with a capacitor dielectric layer 13 having a remaining thickness, and this capacitor dielectric layer 13 having the remaining thickness is covered with a mask layer 30. Also, the metal layer 14 has a portion not covered by the metal layer 16, while the top surface of this portion is covered with a capacitor dielectric layer 15 having a remaining thickness, and this capacitor dielectric layer 15 having the remaining thickness is covered with a mask layer 30. The top surface of the metal layer 16 is covered with a mask layer 30. The mask layer 30 serves as a mask during an etching process and is anti-reflective. For example, the mask layer 30 may be a BARC comprising SiON. The metal-metal capacitor 80 is disposed on the substrate 100 and covered with an IMD layer 120. The metal layer 12, the capacitor dielectric layer 13, and the metal layer 14 constitute a first capacitor ($C_1$) or lower capacitor. The metal layer 14, the capacitor dielectric layer 15, and the metal layer 16 constitute a second capacitor ($C_2$) or upper capacitor. A plurality of conductive vias are formed in the IMD layer 120. The metal layer 12 of the metal-metal capacitor 80 is electrically connected to a first conductive terminal 42 through at least one conductive via 31 that penetrates through the IMD layer 120 and the mask layer 30 disposed on the metal layer 12. The metal layer 14 is electrically connected to a second conductive terminal 44 through at least one conductive via 32 that penetrates through the IMD layer 120 and the mask layer 30 disposed on the metal layer 14. The metal layer 16 is electrically connected to the first conductive terminal 42 through at least one conductive via 33 that penetrates through the IMD layer 120 and the mask layer 30. In other words, in the present invention, the metal layer 12, namely, one electrode of the lower capacitor $C_1$, is electrically coupled with the metal layer 16, namely, one electrode of the upper capacitor $C_2$. The metal layer 14 serves as a common electrode of the lower capacitor $C_1$ and the upper capacitor $C_2$ and is interposed between the metal layer 12 and the metal layer 16 as a sandwich-like structure.

Figure 7:
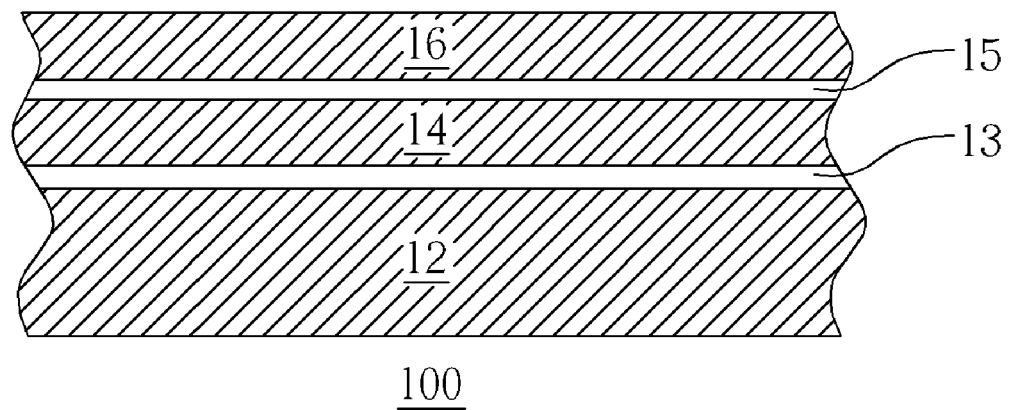
FIGS. 7-14 are schematic cross-sectional diagrams illustrating the method of making the metal-metal capacitor structure according to the present invention.

Please refer to FIGS. 7-14. FIGS. 7-14 are schematic cross-sectional diagrams illustrating the method of making the metal-metal capacitor as set forth in FIG. 6 in accordance with one preferred embodiment of the present invention. As shown in FIG. 7, a substrate 100 is provided. An IMD layer may be disposed on the substrate 100. A metal layer 12, a capacitor dielectric layer 13, a metal layer 14, a capacitor dielectric layer 15, and a metal layer 16 are sequentially deposited on the substrate 100. According to the preferred embodiment, for example, the metal layer 12 is the third layer metal (Metal-3) of the layers of metal interconnects of the integrated circuit, and the metal layer 12 has a thickness of about 5000 angstroms. The metal layer 12 may be a composite layer of, for example, Ti/TiN, Al, and Ti/TiN, but not limited thereto. The metal layer 14 is thinner than the metal layer 12 and may comprise metal or alloy such as Ti/TiN with a thickness of about 150 angstroms/1000 angstroms, but not limited thereto. The capacitor dielectric layer may be composed of silicon oxide, silicon nitride, silicon oxy-nitride (SiON), or tantalum oxide. Silicon oxide, silicon nitride and silicon oxy-nitride may be formed using low-pressure chemical vapor deposition (LPCVD), plasma enhanced chemical vapor deposition (PECVD), or high-density plasma CVD (HDPCVD). According to a preferred embodiment of the present invention, the capacitor dielectric layers 13 and 15 are PECVD dielectric layers with a thickness of 570 angstroms. In other embodiments, the capacitor dielectric layers 13 and 15 may comprise other proper dielectric materials.

Figure 8:
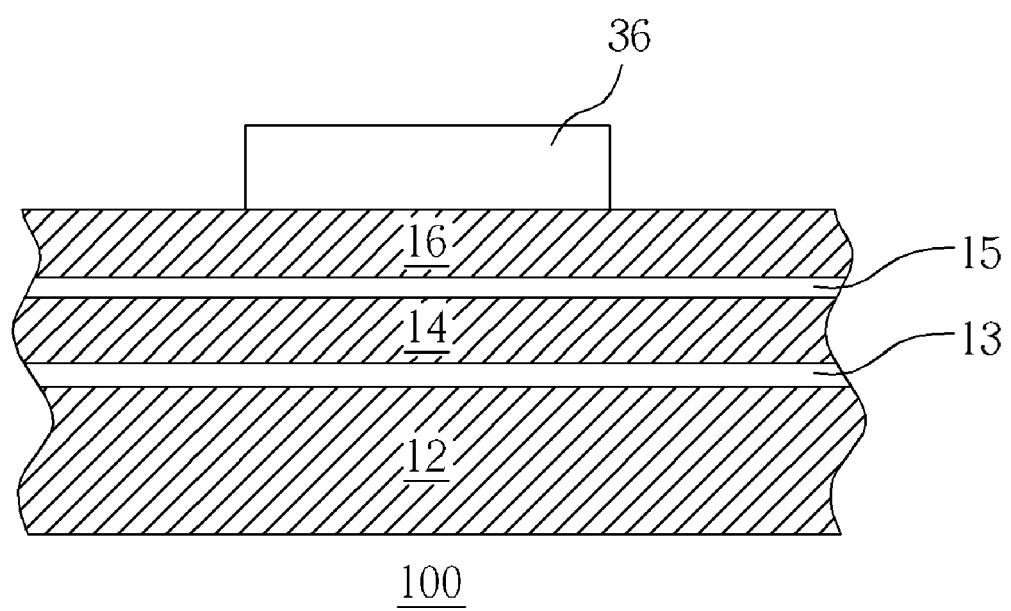
Figure 9:
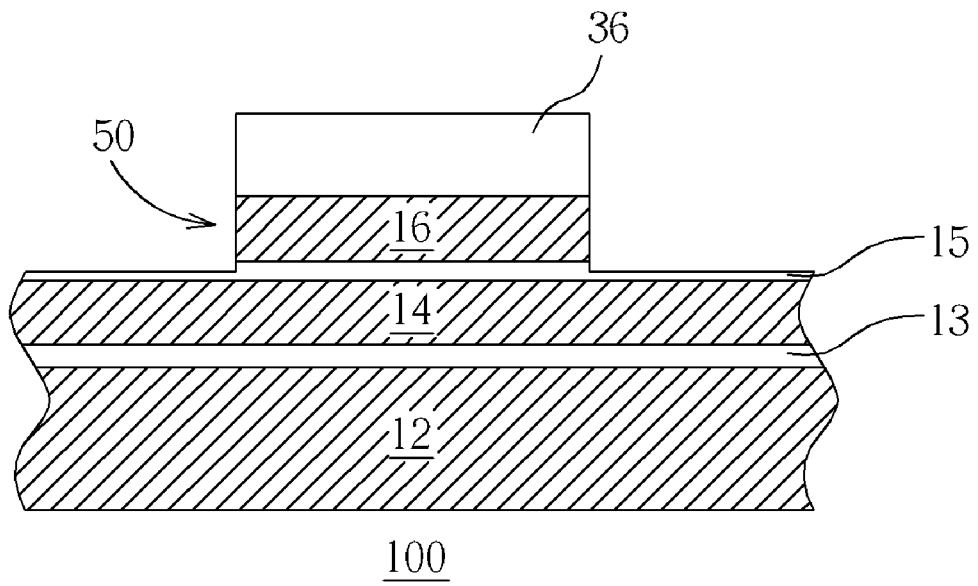

Thereafter, as shown in FIG. 8, a mask layer 36 is formed and patterned to expose a portion of the metal layer 16. The mask layer 36 may be a photo resist mask layer or a hard mask layer comprising oxide or nitride. The patterned photo resist mask layer can be formed using a lithographic process. The patterned hard mask layer can be formed using a lithographic process and an etching process. As shown in FIG. 9, the portion of the metal layer 16 and the underlying capacitor dielectric layer 15 are etched. The etching process may be an anisotropic dry etching process. After the metal layer 16 are etched through and a partial thickness of the capacitor dielectric layer 15 is etched away, the etching is allowed to stop at the capacitor dielectric layer 15, that is, the capacitor dielectric layer 15 is not etched throughout, and thereby the portion of the capacitor dielectric layer 15 still possesses a remaining thickness. The remaining thickness is not particularly limited. The area of the metal layer 16 is smaller than the area of the metal layer 14. Thereby, an upper capacitor structure 50 constituted by the metal layer 16, the capacitor dielectric layer 15, and the metal layer 14 is formed. Because a mask layer is utilized in this etching step, the extent of the etching can be well controlled. Accordingly, the etching can be stably controlled to stop at the capacitor dielectric layer 15.

Figure 10:
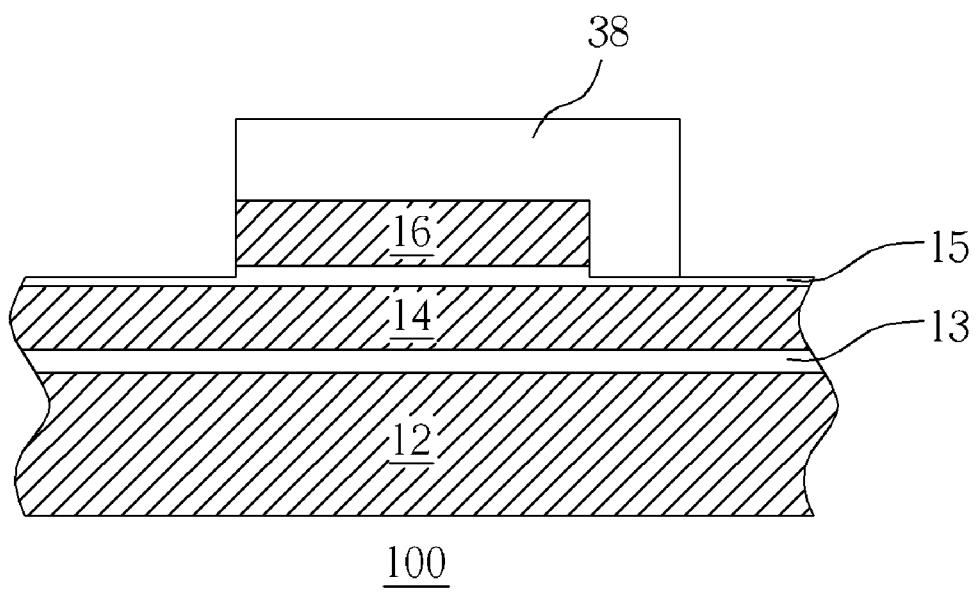
Figure 11:
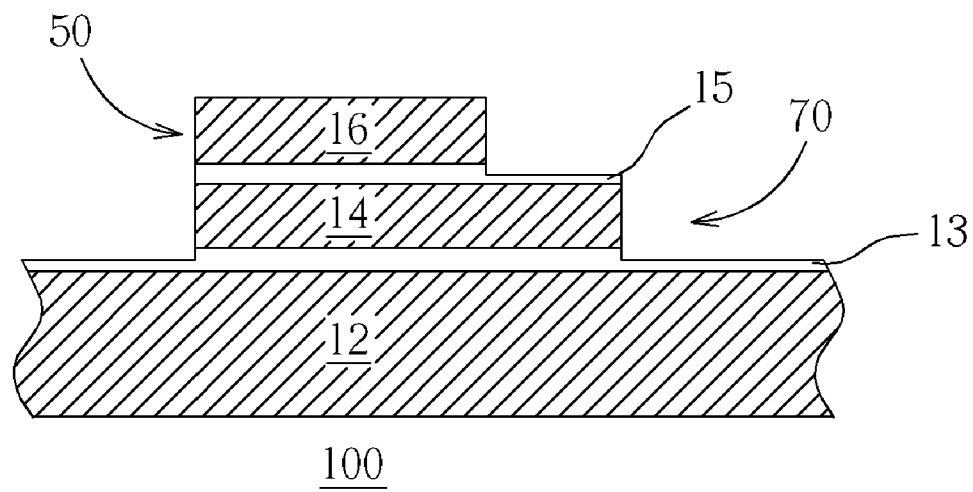

Thereafter, as shown in FIG. 10, a mask layer 38 is formed to cover the metal layer 16 and the capacitor dielectric layer 15 and patterned to expose a portion of the capacitor dielectric layer 15. The mask layer 38 may be a photo resist mask layer or a hard mask layer comprising oxide or nitride. The patterned photo resist mask layer can be formed using a lithographic process. The patterned hard mask layer can be formed using a lithographic process and an etching process. As shown in FIG. 11, the capacitor dielectric layer 15, the metal layer 14, and the capacitor dielectric layer 13 are etched. After the capacitor dielectric layer 15 and the metal layer 14 are etched through and a partial thickness of the capacitor dielectric layer 13 is etched away, the etching is allowed to stop at the capacitor dielectric layer 13, that is, the capacitor dielectric layer 13 is not etched throughout, and thereby the portion of the capacitor dielectric layer 13 still possesses a remaining thickness. The remaining thickness is not particularly limited. The area of the metal layer 14 is smaller than the area of the metal layer 12. Thereby, a lower capacitor structure 70 constituted by the metal layer 14, the capacitor dielectric layer 13, and the metal layer 12 is formed.

Figure 12:
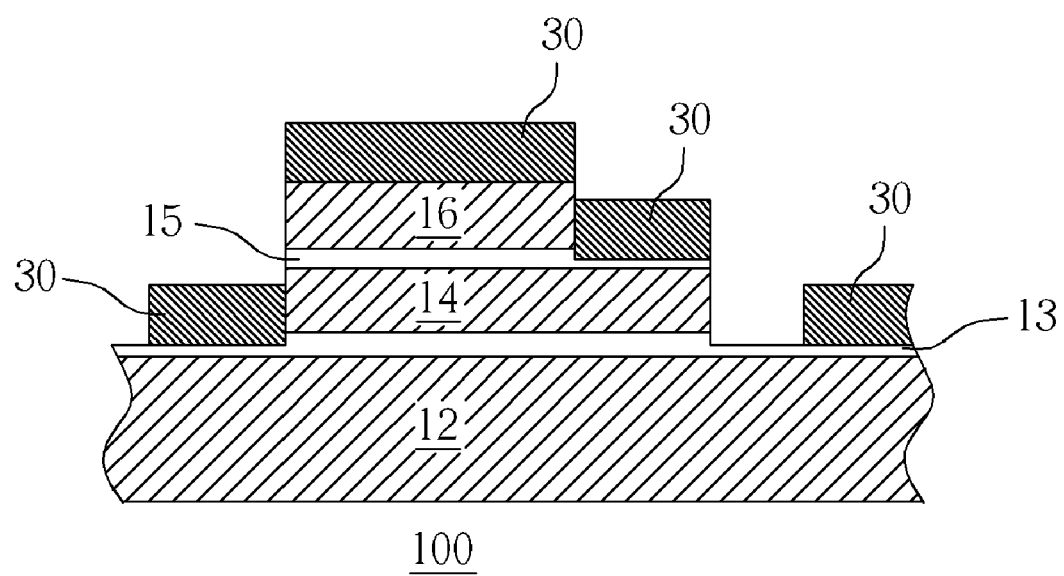
Figure 13:
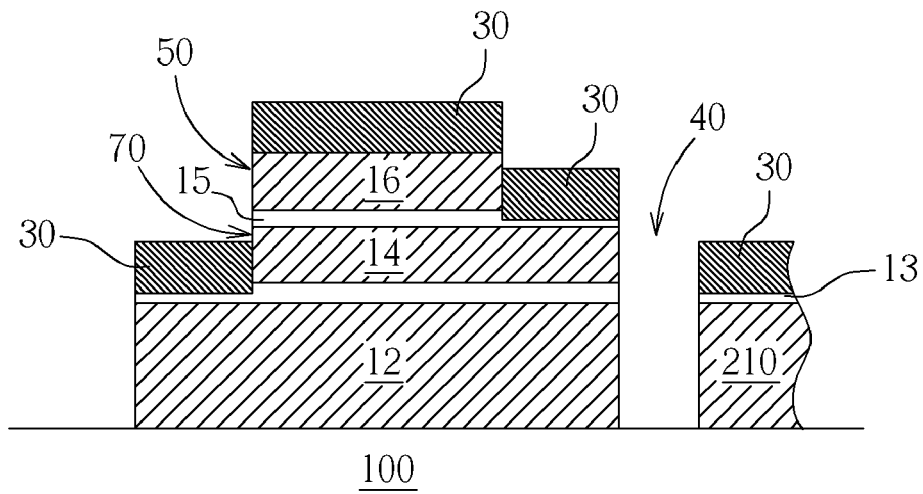

Thereafter, as shown in FIG. 12, a mask layer 30 is formed on the exposed metal layer 16, capacitor dielectric layer 15, and capacitor dielectric layer 13. The mask layer 30 comprises for example SiON and may be with a thickness of for example 300 angstroms. The mask layer 30 also has a function of anti-reflection to avoid reflection caused by the underlying metal layer. The mask layer 30 may be formed by deposition and patterned by a lithography process and an etching process to expose the capacitor dielectric layer 13 to be etched. Each mask layer 30 formed on the exposed metal layer 16, the capacitor dielectric layer 15, and the capacitor dielectric layer 13 may be identical or different. As shown in FIG. 13, the exposed portion of the capacitor dielectric layer 13 is etched through using the mask layer 30 as a mask, and then the underlying metal layer 12 and the substrate 100 are etched. The etching is allowed to stop on or in the substrate 100, to form a trench 40 dividing the metal layer 12 into two portions. One serves as the electrode plate of the capacitor structure, and the other constitutes a conductive wire of a metal interconnect. Thereby, the border of the metal-metal capacitor 80 is formed. The metal-metal capacitor 80 are separated from the conductive wire 210 by the trench 40.

Figure 14:
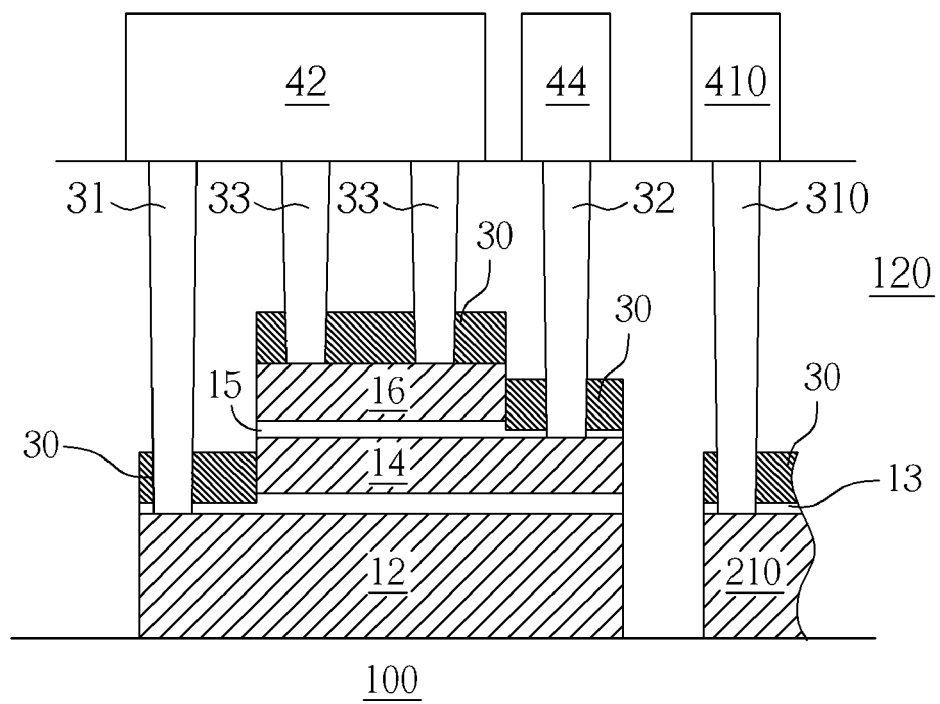

Thereafter, as shown in FIG. 14, an IMD layer 120 is deposited on the mask layer 30 and fills the trench 40. The IMD layer 120 is planarized. A lithography process and an etching process are carried out to etch the IMD layer 120 and the mask layer 30 to form a via hole on the metal layer 16, to etch the IMD layer 120, the mask layer 30, and the capacitor dielectric layer 15 with a remaining thickness to form a via hole on the metal layer 14, to etch the IMD layer 120, the mask layer 30, and the capacitor dielectric layer 13 with a remaining thickness to form a via hole on the metal layer 12. Thereafter, a conductive material, such as metal, is filled into the via holes to form a plurality of metal vias 31, 32, 33, and 310, that is, the metal via 31 penetrates the mask layer 30 and the capacitor dielectric layer 13 with a remaining thickness to electrically connect with the metal layer 12, the metal via 32 penetrates the mask layer 30 and the capacitor dielectric layer 15 with a remaining thickness to electrically connect with the metal layer 14, the metal via 33 penetrates the mask layer 30 to electrically connect with the metal layer 16, and the metal via 310 penetrates the mask layer 30 and the capacitor dielectric layer 13 with a remaining thickness to electrically connect with the conductive wire 210.

Furthermore, still as shown in FIG. 14, definition of Metal-4 interconnection is carried out on the IMD layer 120. A first conductive terminal 42 and a second conductive terminal 44 are formed above the capacitor structure 80 on the IMD layer 120. A fourth level interconnection line 410 is also defined above the metal via 310 to electrically connect to the conductive wire 210. The first conductive terminal 42 is electrically connected to the metal layer 12 and the metal layer 16 through the metal vias 31 and 33 respectively. The second metal layer 14 of the capacitor structure 80 is electrically connected to the second conductive terminal 44 through the metal via 32.

All combinations and sub-combinations of the above-described features also belong to the present invention. Those skilled in the art will readily observe that numerous modifications and alterations of the device and method may be made while retaining the teachings of the invention.

What is claimed is:

1. A method of making a metal-metal capacitor, comprising:
   providing a substrate;
   forming, in the order of, a first metal layer, a first dielectric layer, a second metal layer, a second dielectric layer, and a third metal layer over the substrate;
   forming a first mask layer covering the third metal layer, patterning the first mask layer to expose a portion of the third metal layer;
   etching the portion of the third metal layer exposed and the underlying second dielectric layer using the first mask layer as a mask and allowing the etching to stop at the second dielectric layer while not penetrating therethrough, thereby forming an upper capacitor structure comprising a second metal layer, a second dielectric layer, and a third metal layer;

forming a second mask layer covering the third metal layer and the second dielectric layer, patterning the second mask layer to expose a portion of the second dielectric layer;

etching the portion of the second dielectric layer exposed, the underlying second metal layer and the underlying first dielectric layer using the second mask layer as a mask and allowing the etching to stop at the first dielectric layer while not penetrating therethrough, thereby forming a lower capacitor structure comprising a second metal layer, a first dielectric layer, and a first metal layer;

removing the second mask layer;

forming a third mask layer covering the third metal layer, the second dielectric layer, and the first dielectric layer, patterning the third mask layer to expose a portion of the first dielectric layer, wherein the third mask layer is anti-reflective;

etching the portion of the first dielectric layer exposed, the underlying first metal layer and the substrate using the third mask layer as a mask and allowing the etching to stop at the substrate, thereby forming the border of the metal-metal capacitor and a metal interconnect conductive wire comprising the first metal layer, wherein the metal-metal capacitor is separated from the metal interconnect conductive wire by a trench;

depositing an inter-metal dielectric layer covering the third mask layer and filling the trench, planarizing the inter-metal dielectric layer; and;

etching the inter-metal dielectric layer and the third mask layer to form at least one via hole on the first metal layer, the second metal layer, and the third metal layer.

2. The method of claim 1, wherein the third mask layer comprises a bottom anti-reflective coating (BARC) layer.

3. The method of claim 1, wherein the third mask layer comprises SiON.

4. The method of claim 1, wherein the first mask layer comprises a photo resist layer.

5. The method of claim 1, wherein the second mask layer comprises a photo resist layer.

6. The method of claim 1, further comprising a step of filling a metal material into the via hole on the first metal layer, the via hole on the second metal layer, and the via hole on the third metal layer to form metal vias.

7. The method of claim 6, further comprising forming a terminal contacting the metal via on the first metal layer and the metal via on the third metal layer for electrically connecting the first metal layer with the third metal layer.

8. A metal-metal capacitor, comprising:

a first metal layer;

a first capacitor dielectric layer disposed on the first metal layer;

a second metal layer stacked on the first capacitor dielectric layer, wherein the first metal layer, the first capacitor dielectric layer, and the second metal layer constitute a lower capacitor structure;

a second capacitor dielectric layer disposed on the second metal layer; and a third metal layer stacked on the second capacitor dielectric layer, wherein the second metal layer, the second capacitor dielectric layer, and the third metal layer constitute an upper capacitor;

wherein a portion of the first metal layer is covered with a remaining thickness of the first capacitor dielectric layer and a first mask layer in the order, a portion of the second metal layer is covered with a remaining thickness of the second capacitor dielectric layer and a second mask layer in the order, a portion of the third metal layer is covered with a third mask layer, the first mask layer, the second mask layer, and the third mask layer each are anti-reflective.

9. The metal-metal capacitor of claim 8, wherein the first mask layer, the second mask layer, and the third mask layer are identical.

10. The metal-metal capacitor of claim 8, wherein the first mask layer, the second mask layer, and the third mask layer each comprise a bottom anti-reflective coating.

11. The metal-metal capacitor of claim 8, wherein the first mask layer, the second mask layer, and the third mask layer each comprise SiON.

12. The metal-metal capacitor of claim 8, wherein the first metal layer and the third metal layer are electrically connected to a first terminal of the metal-metal capacitor, and the second metal layer is electrically connected to a second terminal of the metal-metal capacitor.

13. The metal-metal capacitor of claim 8, wherein the first metal layer and the third metal layer are electrically connected to a first terminal of the metal-metal capacitor through a first metal via and a third metal via respectively, the second metal layer is electrically connected to a second terminal of the metal-metal capacitor through a second metal via, the first metal via passes through the first mask layer and the first capacitor dielectric layer of the remaining thickness, the second metal via passes through the second mask layer and the second capacitor dielectric layer of the remaining thickness, and the third metal via passes through the third mask layer.

14. The metal-metal capacitor of claim 8, wherein the area of the second metal layer is less than the area of the first metal layer.

15. The metal-metal capacitor of claim 8, wherein the area of the third metal layer is less than the area of the second metal layer.

16. The metal-metal capacitor of claim 8, wherein the second metal layer is thinner than the first metal layer.

* * * * *